United States Patent
Mase et al.

(10) Patent No.: US 12,526,550 B2
(45) Date of Patent: Jan. 13, 2026

(54) LIGHT DETECTION DEVICE AND METHOD FOR DRIVING LIGHT SENSOR

(71) Applicant: HAMAMATSU PHOTONICS K.K., Hamamatsu (JP)

(72) Inventors: Mitsuhito Mase, Hamamatsu (JP); Masaru Nakano, Hamamatsu (JP); Jun Hiramitsu, Hamamatsu (JP); Akihiro Shimada, Hamamatsu (JP); Hiroaki Ishii, Hamamatsu (JP); Toshinori Ito, Hamamatsu (JP); Yuma Tanaka, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 0 days.

(21) Appl. No.: 17/922,806

(22) PCT Filed: Mar. 17, 2021

(86) PCT No.: PCT/JP2021/010873
§ 371 (c)(1),
(2) Date: Nov. 2, 2022

(87) PCT Pub. No.: WO2021/225036
PCT Pub. Date: Nov. 11, 2021

(65) Prior Publication Data
US 2023/0171522 A1    Jun. 1, 2023

(30) Foreign Application Priority Data

May 8, 2020   (JP) .................. 2020-082446

(51) Int. Cl.
*H04N 25/771*   (2023.01)
*H04N 25/621*   (2023.01)
(Continued)

(52) U.S. Cl.
CPC ........ *H04N 25/771* (2023.01); *H04N 25/621* (2023.01); *H04N 25/76* (2023.01);
(Continued)

(58) Field of Classification Search
CPC ...... H04N 25/621; H04N 25/76; H04N 25/77; H04N 25/771; H01L 27/146;
(Continued)

(56) References Cited

U.S. PATENT DOCUMENTS 5,401,952 A * 3/1995 Sugawa ............ H01L 27/14643
                                                              348/308
2002/0036300 A1 * 3/2002 Pain .................... H04N 25/531
                                                              348/E3.019
(Continued)

FOREIGN PATENT DOCUMENTS

CN    101784911 A    7/2010
CN    102244084 A    11/2011
(Continued)

OTHER PUBLICATIONS

International Preliminary Report on Patentability mailed Nov. 17, 2022 for PCT/JP2021/010873.
(Continued)

*Primary Examiner* — Lin Ye
*Assistant Examiner* — Chriss S Yoder, III
(74) *Attorney, Agent, or Firm* — Faegre Drinker Biddle & Reath LLP

(57) ABSTRACT

A light detection device includes a controller that controls electric potentials of a charge collection electrode and a transfer gate electrode so that potential energy in a region immediately below the charge collection electrode is a first level, and potential energy in a region immediately below the transfer gate electrode is higher than the potential energy in the region immediately below the charge collection elec-
(Continued)

trode in a first period, and so that the potential energy in the region immediately below the charge collection electrode is a second level higher than the first level, and the potential energy in the region immediately below the transfer gate electrode is lower than the potential energy in the region immediately below the charge collection electrode in a second period after the first period.

9 Claims, 12 Drawing Sheets

(51) Int. Cl.
*H04N 25/76* (2023.01)
*H04N 25/77* (2023.01)
*H10F 39/00* (2025.01)
*H10F 39/12* (2025.01)
*H10F 39/18* (2025.01)

(52) U.S. Cl.
CPC ............ *H04N 25/77* (2023.01); *H10F 39/12* (2025.01); *H10F 39/18* (2025.01); *H10F 39/802* (2025.01); *H10F 39/803* (2025.01); *H10F 39/8033* (2025.01); *H10F 39/8037* (2025.01)

(58) Field of Classification Search
CPC ......... H01L 27/14603; H01L 27/14609; H01L 27/1461; H01L 27/14612; H01L 27/14643; H10F 39/12; H10F 39/18; H10F 39/802; H10F 39/803; H10F 39/8033; H10F 39/8037
See application file for complete search history.

(56) References Cited

U.S. PATENT DOCUMENTS

| | | | |
|---|---|---|---|
| 2005/0110093 A1* | 5/2005 | Altice | H01L 27/14609 348/E3.018 |
| 2006/0092296 A1 | 5/2006 | McGrath et al. | |
| 2008/0122956 A1 | 5/2008 | Xu et al. | |
| 2012/0056080 A1* | 3/2012 | Levine | H04N 25/622 250/214 P |
| 2014/0374867 A1* | 12/2014 | De Munck | H10F 39/18 257/443 |

FOREIGN PATENT DOCUMENTS

| | | |
|---|---|---|
| CN | 102544036 A | 7/2012 |
| CN | 104115271 A | 10/2014 |
| CN | 109691086 A | 4/2019 |
| JP | H05-211321 A | 8/1993 |
| JP | H10-012858 A | 1/1998 |
| JP | H11-251571 A | 9/1999 |
| JP | 2005-217242 A | 8/2005 |
| JP | 2010-010740 A | 1/2010 |
| JP | 2013-179275 A | 9/2013 |
| JP | 2013-207078 A | 10/2013 |
| JP | 2015-005752 A | 1/2015 |
| JP | 2017-199855 A | 11/2017 |
| JP | 2018-160667 A | 10/2018 |
| JP | 2020-022041 A | 2/2020 |
| KR | 20120060915 A | 6/2012 |
| WO | WO 2011/043432 A1 | 4/2011 |

OTHER PUBLICATIONS

Liang Bing, Yi Mao-xiang, Yan Tian-xin, "Design of high-performance linear CCD development platform", Journal of Hefei University of Technology, Oct. 28, 2010, vol. 33 No. 10.

* cited by examiner

LIGHT DETECTION DEVICE AND METHOD FOR DRIVING LIGHT SENSOR

TECHNICAL FIELD

An aspect of the present disclosure relates to a light detection device and a method for driving a light sensor.

BACKGROUND ART

As a light sensor, there has been a known light sensor including a charge generation region in which charges are generated in response to incident light, a charge accumulation region in which charges generated in the charge generation region are accumulated, a charge transfer region in which charges are transferred from the charge accumulation region, and a transfer gate electrode disposed on a region between the charge accumulation region and the charge transfer region (for example, see Patent Literature 1). In such a light sensor, charges can be transferred from the charge accumulation region to the charge transfer region at high speed.

CITATION LIST

Patent Literature

Patent Literature 1: Japanese Unexamined Patent Publication No. 2015-5752

SUMMARY OF INVENTION

Technical Problem

The above-described light sensor is required to increase a saturated charge amount in the charge accumulation region, and to improve efficiency of charge transfer from the charge accumulation region to the charge transfer region.

An object of an aspect of the disclosure is to provide a light detection device and a method for driving a light sensor capable of realizing both an increase in saturated charge amount and improvement of charge transfer efficiency.

Solution to Problem

A light detection device according to an aspect of the disclosure includes a light sensor, and a controller that controls the light sensor, in which the light sensor includes a charge generation region that generates charges in response to incident light, a charge accumulation region in which charges generated in the charge generation region are accumulated, a charge transfer region to which charges transferred from the charge accumulation region, a charge collection electrode disposed on the charge accumulation region, and a transfer gate electrode disposed on a region between the charge accumulation region and the charge transfer region, and the controller controls electric potentials of the charge collection electrode and the transfer gate electrode so that potential energy in a region immediately below the charge collection electrode is a first level, and potential energy in a region immediately below the transfer gate electrode is higher than the potential energy in the region immediately below the charge collection electrode in a first period, and controls electric potentials of the charge collection electrode and the transfer gate electrode so that the potential energy in the region immediately below the charge collection electrode is a second level higher than the first level, and the potential energy in the region immediately below the transfer gate electrode is lower than the potential energy in the region immediately below the charge collection electrode in a second period after the first period.

In this light detection device, in the first period, the potential energy in the region immediately below the transfer gate electrode is higher than the potential energy in the region immediately below the charge collection electrode, and charges generated in the charge generation region are accumulated in the charge accumulation region. In the second period, the potential energy in the region immediately below the transfer gate electrode is lower than the potential energy in the region immediately below the charge collection electrode, and charges are transferred from the charge accumulation region to the charge transfer region. In this light detection device, in the first period, the potential energy in the region immediately below the charge collection electrode is set to the first level lower than the second level. In this way, it is possible to deepen a potential energy well in the charge accumulation region, and to increase the saturated charge amount in the charge accumulation region. Meanwhile, in the second period, the potential energy in the region immediately below the charge collection electrode is set to the second level higher than the first level. In this way, it is possible to increase a difference in potential energy between the charge accumulation region and the charge transfer region, and to improve charge transfer efficiency. Therefore, according to this light detection device, it is possible to achieve both an increase in saturated charge amount and improvement of charge transfer efficiency.

The charge generation region may include an avalanche multiplication region. In this case, avalanche multiplication may be caused in the charge generation region, and detection sensitivity may be increased. Meanwhile, in this case, the amount of charge generated in the charge generation region is extremely large. However, in this light detection device, the saturated charge amount is increased as described above, and thus saturation of a capacity may be suppressed even in such a case.

The light sensor may further include an overflow region, and an overflow gate electrode disposed on a region between the charge accumulation region and the overflow region, and the controller may control electric potentials of the charge collection electrode, the transfer gate electrode, and the overflow gate electrode so that potential energy in a region immediately below the overflow gate electrode is higher than the potential energy in the region immediately below the charge collection electrode and is lower than the potential energy in the region immediately below the transfer gate electrode in the first period. In this case, during the first period, charges overflowing from the charge accumulation region may be moved to the overflow region.

The light sensor may further include an intervening region having a conductive type different from a conductive type of the charge accumulation region and disposed between the charge accumulation region and the charge collection electrode. In this case, generation of dark current around the charge collection electrode may be suppressed.

In a method for driving a light sensor according to an aspect of the disclosure, the light sensor includes a charge generation region that generates charges in response to incident light, a charge accumulation region in which charges generated in the charge generation region are accumulated, a charge transfer region to which charges transferred from the charge accumulation region, a charge collection electrode disposed on the charge accumulation region, and a transfer gate electrode disposed on a region between the charge accumulation region and the charge transfer region, and the method for driving the light sensor includes a first step of controlling electric potentials of the charge collection electrode and the transfer gate electrode so that potential energy in a region immediately below the charge collection electrode is a first level, and potential energy in a region immediately below the transfer gate electrode is higher than the potential energy in the region immediately below the charge collection electrode, and a second step of controlling electric potentials of the charge collection electrode and the transfer gate electrode so that the potential energy in the region immediately below the charge collection electrode is a second level higher than the first level, and the potential energy in the region immediately below the transfer gate electrode is lower than the potential energy in the region immediately below the charge collection electrode after the first step.

In the first step of the method for driving the light sensor, the potential energy in the region immediately below the transfer gate electrode is set to be higher than the potential energy in the region immediately below the charge collection electrode, and charges are accumulated in the charge accumulation region. In the second step, the potential energy in the region immediately below the transfer gate electrode is set to be lower than the potential energy in the region immediately below the charge collection electrode, and charges are transferred from the charge accumulation region to the charge transfer region. In the first step, the potential energy in the region immediately below the charge collection electrode is set to the first level lower than the second level. In this way, it is possible to deepen the potential energy well in the charge accumulation region, and to increase the saturated charge amount in the charge accumulation region. Meanwhile, in the second step, the potential energy in the region immediately below the charge collection electrode is set to the second level higher than the first level. In this way, it is possible to increase a difference in potential energy between the charge accumulation region and the charge transfer region, and to improve charge transfer efficiency. Therefore, according to this method for driving the light sensor, it is possible to achieve both an increase in saturated charge amount and improvement of charge transfer efficiency.

Advantageous Effects of Invention

According to an aspect of the disclosure, it is possible to provide a light detection device and a method for driving a light sensor capable of realizing both an increase in saturated charge amount and improvement of charge transfer efficiency.

DESCRIPTION OF EMBODIMENTS

Hereinafter, an embodiment of the disclosure will be described in detail with reference to the drawings. In the following description, the same reference symbols will be used for the same or equivalent elements, and duplicate description will be omitted.

[Configuration of Light Detection Device]

Figure 1:
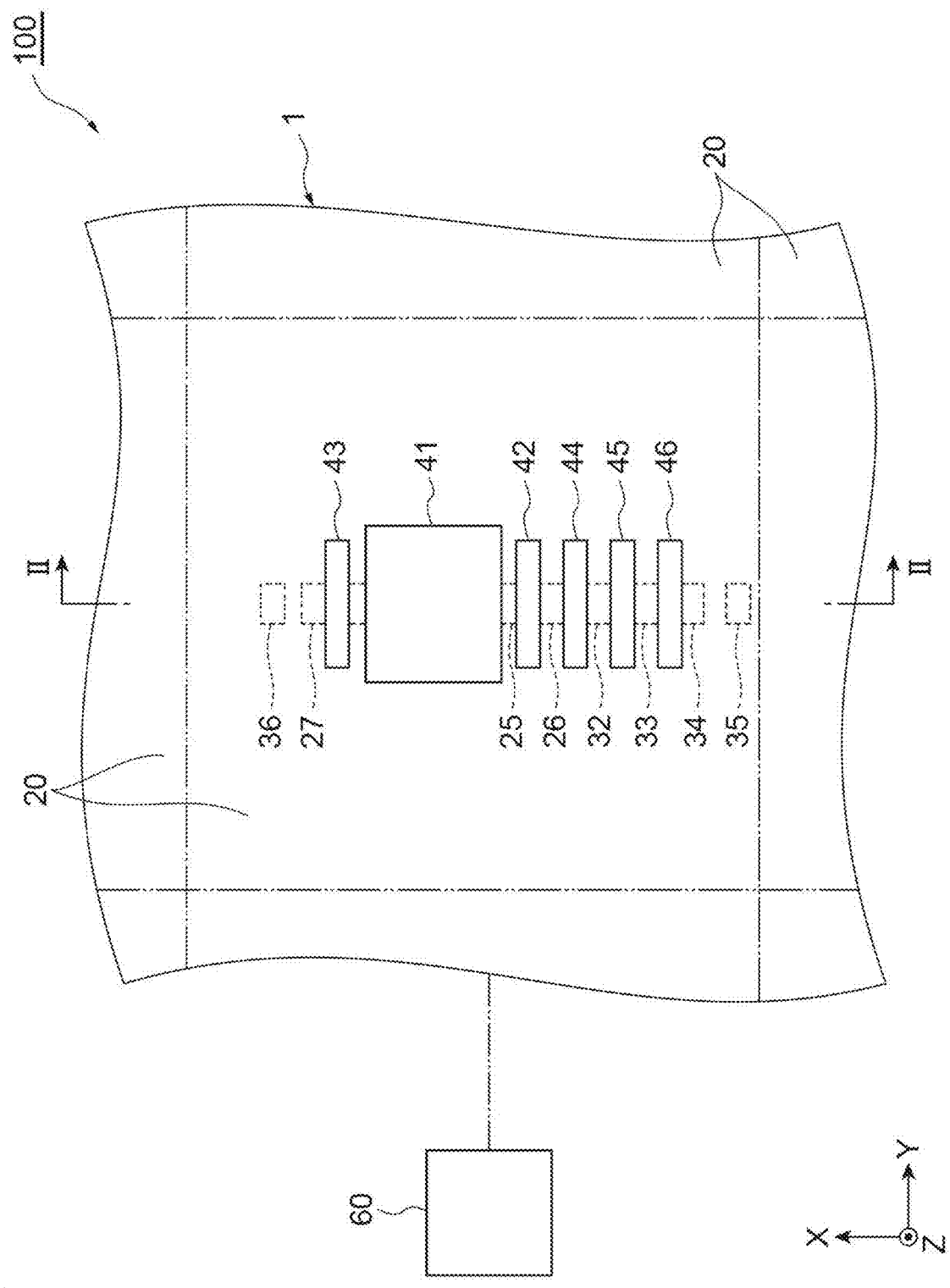
FIG. 1 is a configuration diagram of a light detection device according to an embodiment.

As illustrated in FIG. 1, a light detection device 100 includes an image sensor (light sensor) 1 and a controller 60. The controller 60 controls the image sensor 1. The controller 60 includes, for example, an on-chip integrated circuit mounted on a semiconductor substrate included in the image sensor 1.

Figure 2:
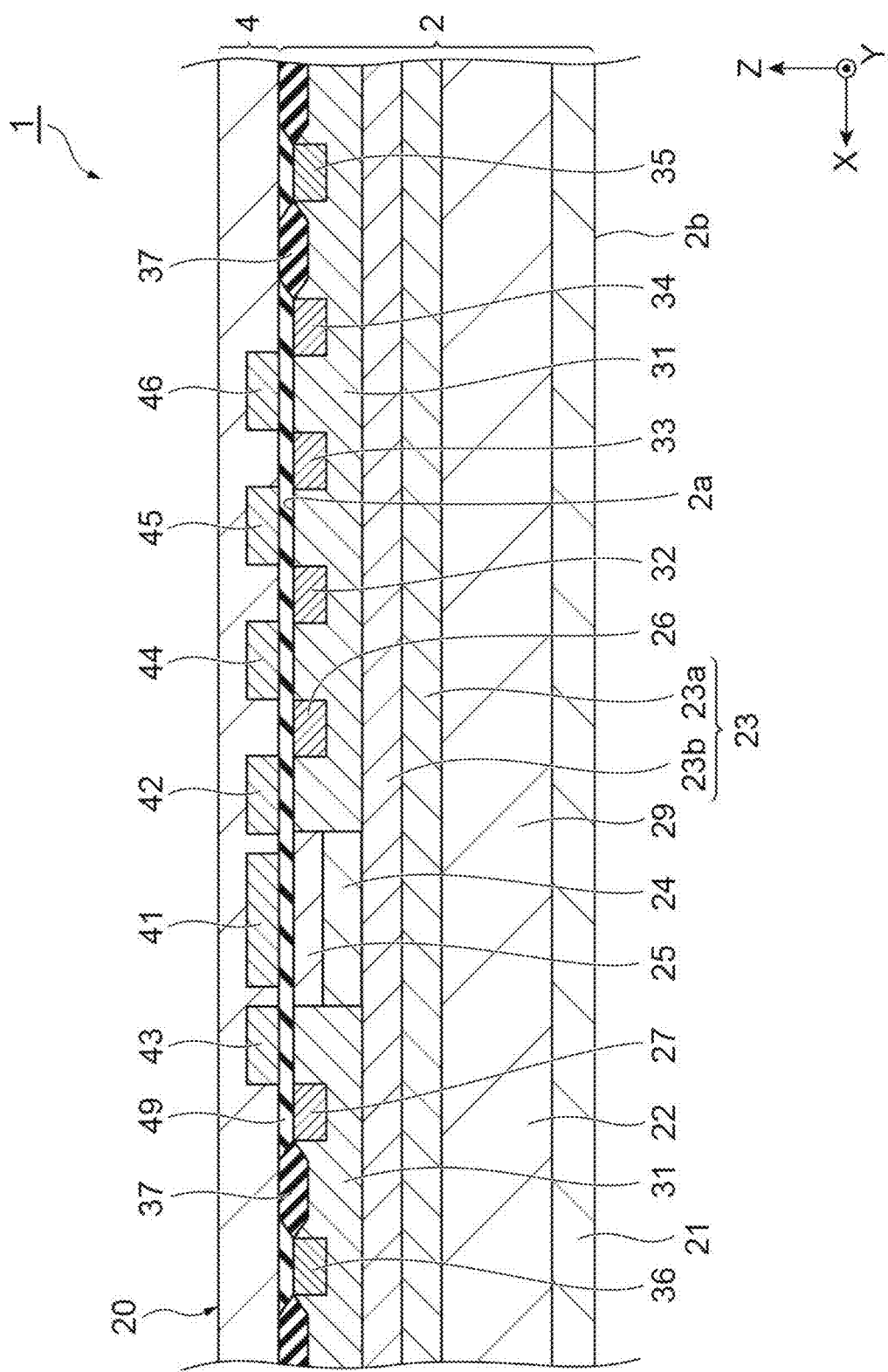
FIG. 2 is a cross-sectional view of an image sensor taken along the line II-II illustrated in FIG. 1.

As illustrated in FIGS. 1 and 2, the image sensor 1 includes a semiconductor layer 2 and an electrode layer 4. The semiconductor layer 2 has a first surface 2a and a second surface 2b. The second surface 2b is a surface of the semiconductor layer 2 on the opposite side from the first surface 2a. The semiconductor layer 2 includes a plurality of pixels 20 disposed along the first surface 2a. The plurality of pixels 20 are two-dimensionally arranged along the first surface 2a. Hereinafter, a thickness direction of the semiconductor layer 2 is referred to as a Z-direction, one direction perpendicular to the Z-direction is referred to as an X-direction, and a direction perpendicular to both the Z-direction and the X-direction is referred to as a Y-direction. Further, one side in the Z-direction is referred to as a first side, and the other side in the Z-direction (a side on the opposite side from the first side) is referred to as a second side. In FIG. 1, illustration of a part of the electrode layer 4 is omitted.

In the semiconductor layer 2, each of the pixels 20 has a semiconductor region 21, a semiconductor region 22, an avalanche multiplication region 23, a charge accumulation region 24, an intervening region 25, a charge transfer region 26, an overflow region 27, and a well region 31. Each of the regions 21 to 27, and 31 are formed by performing various treatments (for example, etching, film formation, impurity injection, etc.) on a semiconductor substrate (for example, a silicon substrate).

The semiconductor region 21 is a p-type (first conductive type) region, and is formed in a layer shape along the second surface 2b in the semiconductor layer 2. The carrier concentration in the semiconductor region 21 is higher than the carrier concentration in the semiconductor region 22. A thickness of the semiconductor region 21 is preferably as thin as possible. As an example, the semiconductor region 21 is a p-type region having the carrier concentration of $1 \times 10^{16}$ cm$^{-3}$ or more, and a thickness thereof is about 1 μm. Note that the semiconductor region 21 may be formed by accumulation by a transparent electrode formed on the second surface 2b through an insulating film.

The semiconductor region 22 is a p-type region, is formed in a layer shape in the semiconductor layer 2, and is located on the first side of the semiconductor region 21. As an example, the semiconductor region 22 is a p-type region having the carrier concentration of $1 \times 10^{15}$ cm$^{-3}$ or less, and a thickness thereof is 2 μm or more, for example, about 10 μm.

The avalanche multiplication region 23 includes a first multiplication region 23a and a second multiplication region 23b. The first multiplication region 23a is a p-type region, is formed in a layer shape in the semiconductor layer 2, and is located on the first side of the semiconductor region 22. As an example, the first multiplication region 23a is a p-type region having the carrier concentration of $1 \times 10^{16}$ cm$^{-3}$ or more, and a thickness thereof is about 1 μm. The second multiplication region 23b is an n-type (second conductive type) region, is formed in a layer shape in the semiconductor layer 2, and is located on the first side of the first multiplication region 23a. As an example, the second multiplication region 23b is an n-type region having the carrier concentration of $1 \times 10^{16}$ cm$^{-3}$ or more, and a thickness thereof is about 1 μm. The first multiplication region 23a and the second multiplication region 23b form a pn junction. The semiconductor regions 21 and 22 and the avalanche multiplication region 23 function as a charge generation region (light absorption region and photoelectric conversion region) 29 that generates charges are generated in response to incident light.

The charge accumulation region 24 is an n-type region, is formed in a layer shape in the semiconductor layer 2, and is located on the first side of the second multiplication region 23b. In this example, the charge accumulation region 24 extends along a plane perpendicular to the Z-direction. As an example, the charge accumulation region 24 is an n-type region having the carrier concentration of $5 \times 10^{15}$ to $1 \times 10^{16}$ cm$^{-3}$, and a thickness thereof is about 1 μm.

The intervening region 25 is a p-type region, and is formed in a layer shape along the first surface 2a in the semiconductor layer 2. The intervening region 25 is disposed between the charge accumulation region 24 and a charge collection electrode 41 described later. The semiconductor region 21, the semiconductor region 22, the first multiplication region 23a, the second multiplication region 23b, the charge accumulation region 24, and the intervening region 25 are arranged in this order along the Z-direction. As an example, the intervening region 25 is a p-type region having the carrier concentration of $1 \times 10^{15}$ cm$^{-3}$ or more, and a thickness thereof is about 0.2 μm.

The charge transfer region 26 is an n-type region, and is formed along the first surface 2a in the semiconductor layer 2. The charge transfer region 26 is disposed inside the well region 31, and is located on the first side of the second multiplication region 23b. The charge transfer region 26 is aligned with the charge accumulation region 24 in the X-direction. As an example, the charge transfer region 26 is an n-type region having the carrier concentration of $1 \times 10^{18}$ cm$^{-3}$ or more, and a thickness thereof is about 0.2 μm.

The overflow region 27 is an n-type region, and is formed along the first surface 2a in the semiconductor layer 2. The overflow region 27 is disposed inside the well region 31, and is located on the first side of the second multiplication region 23b. The overflow region 27 is located on the opposite side from the charge transfer region 26 with respect to the charge accumulation region 24 in the X-direction. As an example, the overflow region 27 is an n-type region having the carrier concentration of $1 \times 10^{18}$ cm$^{-3}$ or more, and a thickness thereof is about 0.2 μm.

The well region 31 is a p-type region, and is formed in a layer shape along the first surface 2a in the semiconductor layer 2. The well region 31 is located on the first side of the second multiplication region 23b. As an example, the well region 31 is a p-type region having the carrier concentration of $1 \times 10^{16}$ to $5 \times 10^{17}$ cm$^{-3}$, and a thickness thereof is about 1 μm.

In the well region 31, in addition to the charge transfer region 26 and the overflow region 27, channel regions 32, 33, and 34, ground regions 35 and 36, and a LOCOS (Local Oxidation of Silicon) region 37 are formed. The channel regions 32 to 34 are n-type regions, and the ground regions 35 and 36 are p-type regions. The charge transfer region 26, the channel regions 32 to 34, and the ground region 35 are arranged in this order along the X-direction. The ground region 36 is located on the opposite side from the charge accumulation region 24 with respect to the overflow region 27 in the X-direction. The LOCOS region 37 is an insulating region, and is provided to surround the ground regions 35 and 36.

The electrode layer 4 is provided on the first surface 2a of the semiconductor layer 2. Each pixel 20 has the charge collection electrode 41, a transfer gate electrode 42, and an overflow gate electrode 43 in the electrode layer 4. The charge collection electrode 41 and the gate electrodes 42 and 43 are formed in the electrode layer 4, and are disposed on the first surface 2a of the semiconductor layer 2 through the insulating film 49. The insulating film 49 is, for example, a silicon nitride film, a silicon oxide film, etc.

The charge collection electrode 41 and the gate electrodes 42 and 43 are made of a material having conductivity and light transmittance (for example, polysilicon). As an example, each of the charge collection electrode 41 and the gate electrodes 42 and 43 has a rectangular shape having two sides facing each other in the X-direction and two sides facing each other in the Y-direction when viewed in the Z-direction.

The charge collection electrode 41 is disposed on the charge accumulation region 24. More specifically, the charge collection electrode 41 is disposed on the charge accumulation region 24 via the intervening region 25 and the insulating film 49. The charge collection electrode 41 overlaps the charge accumulation region 24 in the Z-direction. The transfer gate electrode 42 is disposed on a region between the charge accumulation region 24 and the charge transfer region 26 in the well region 31. The overflow gate electrode 43 is disposed on a region between the charge accumulation region 24 and the overflow region 27 in the well region 31.

Gate electrodes 44, 45, and 46 are further provided on the well region 31. The gate electrode 44 is disposed on a region between the charge transfer region 26 and the channel region 32 in the well region 31. The gate electrode 45 is disposed on a region between the channel regions 32 and 33 in the well region 31. The gate electrode 46 is disposed on a region between the channel regions 33 and 34 in the well region 31.

Figure 3:
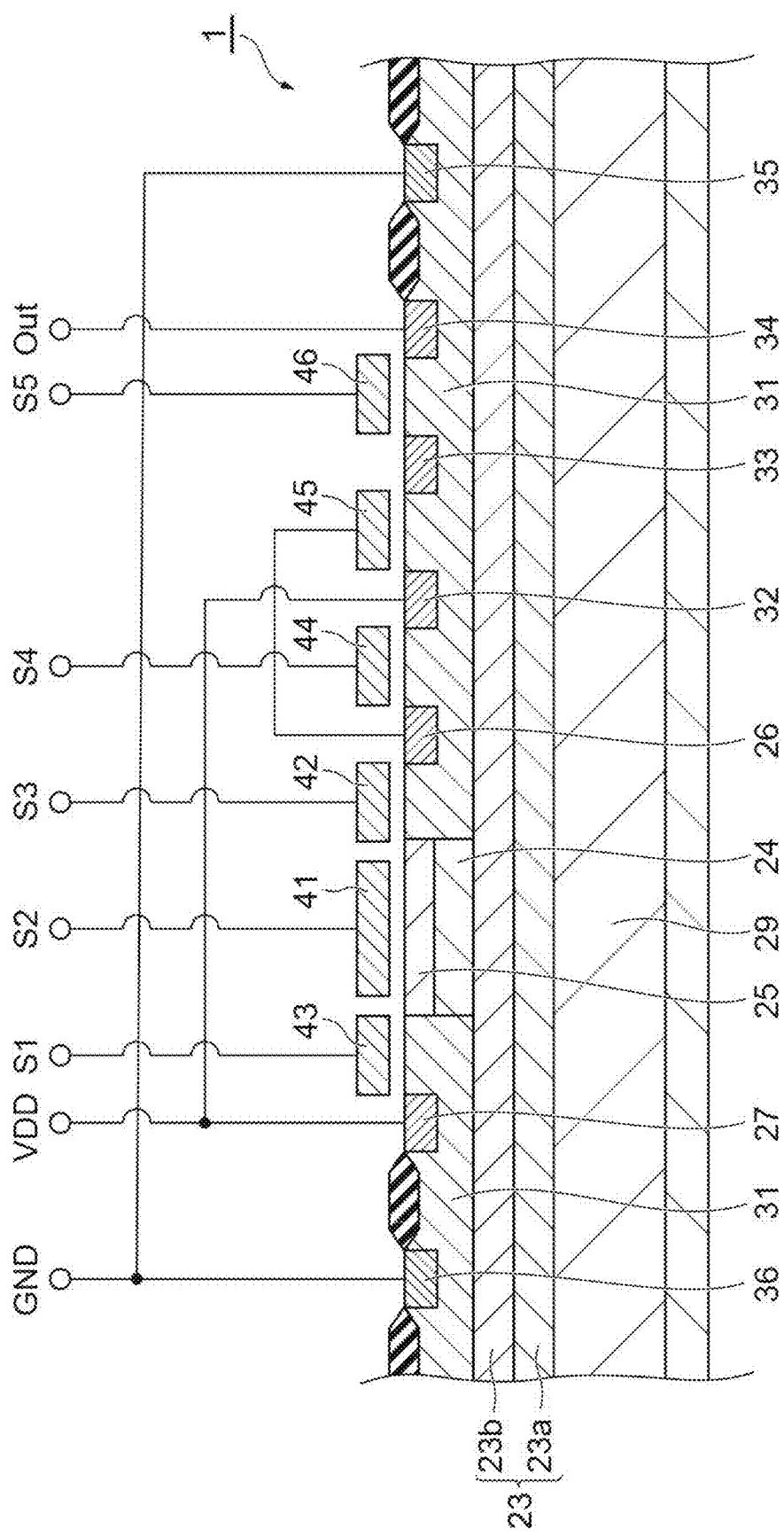
FIG. 3 is a diagram illustrating a connection mode of the image sensor.
Figure 4:
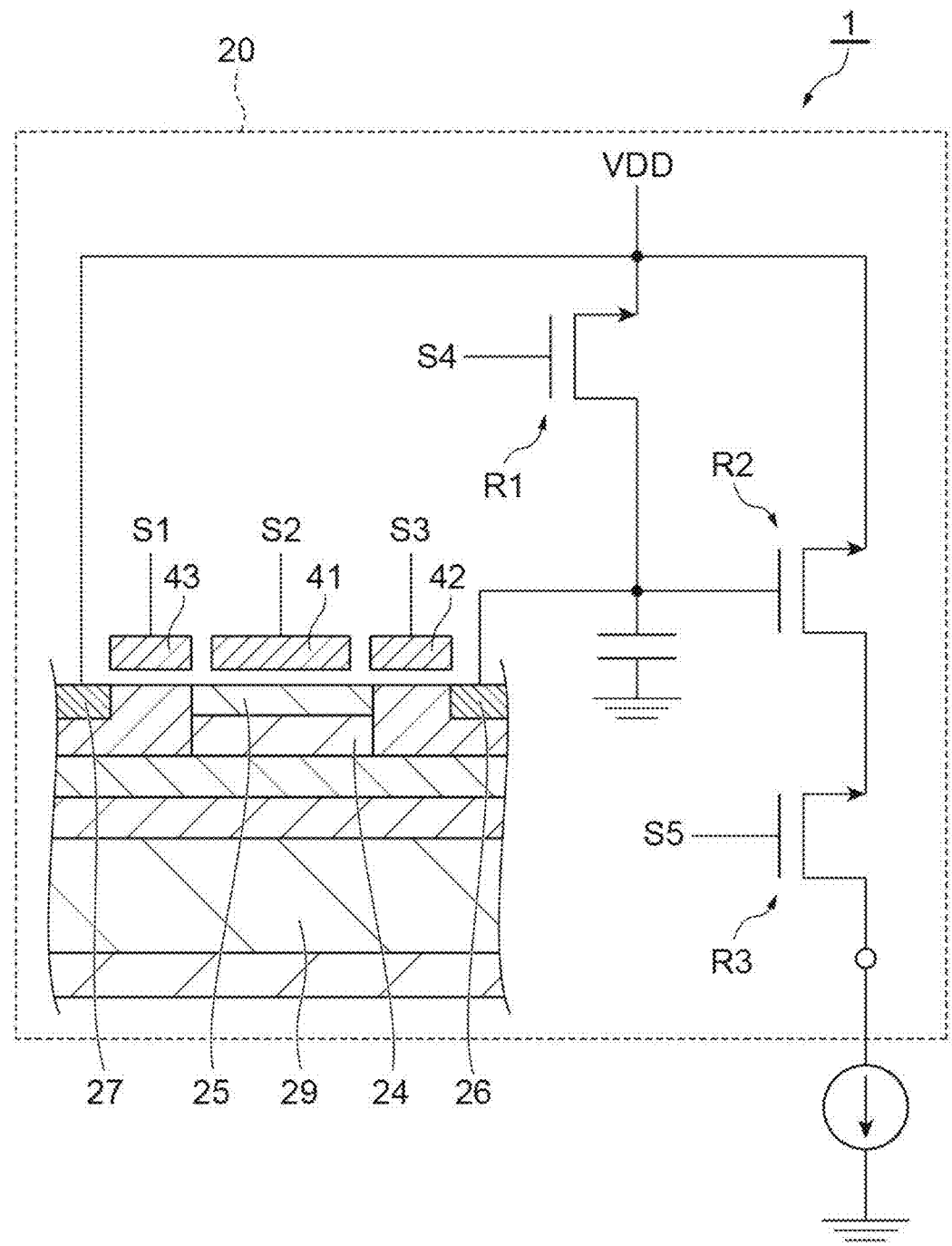
FIG. 4 is a circuit diagram of the image sensor.

As illustrated in FIGS. 3 and 4, control voltages S1 to S5 are applied to the charge collection electrode 41 and the gate electrodes 42 to 44, and 46. The gate electrode 45 is electrically connected to the charge transfer region 26. The overflow region 27 and the channel region 32 are electrically connected to a power supply voltage. The channel region 34 is electrically connected to an output terminal. The ground regions 35 and 36 are grounded. An electric potential in the well region 31 is 0 V. The second multiplication region 23b is fixed at an electric potential higher than 0 V through the charge accumulation region 24, a region immediately below the overflow gate electrode 43, and the overflow region 27. When the second multiplication region 23b is fixed at the electric potential higher than 0 V, the first multiplication region 23a and the well region 31 are electrically separated from each other.

The gate electrode 44 is included in a reset transistor R1 for discharging charges accumulated in the charge transfer region 26 to the outside through the channel region 32 and resetting the charge transfer region 26. The gate electrode 45 is included in a read transistor (source follower) R2 for reading charges accumulated in the charge transfer region 26. The gate electrode 46 is included in a selection transistor R3 for selecting a pixel 20 in which charges are read.

[Method for Driving Image Sensor]

An operation example of the image sensor 1 will be described with reference to FIGS. 5 to 9. An operation below is realized by the controller 60 controlling the image sensor 1. More specifically, the operation is realized by the controller 60 controlling the control voltages S1 to S5. Note that, in the following description, a "region immediately below an electrode" refers to a region that overlaps the electrode in the Z-direction.

First, a first reset process for resetting the charge accumulation region 24 is executed (time T1, FIG. 6(a)). In the first reset process, electric potentials of the charge collection electrode 41 and the overflow gate electrode 43 are controlled so that potential energy $\phi 41$ in a region immediately below the charge collection electrode 41 (charge accumulation region 24) is a high level (second level), and potential energy $\phi 43$ in a region immediately below the overflow gate electrode 43 is lower than the potential energy $\phi 41$. In this way, charges remaining in the charge accumulation region 24 are discharged to the outside through the overflow region 27, and the charge accumulation region 24 is reset. In the first reset process, electric potentials of the charge collection electrode 41, the transfer gate electrode 42, and the gate electrode 44 are controlled so that potential energy $\phi 42$ in a region immediately below the transfer gate electrode 42 and potential energy $\phi 44$ in a region immediately below the gate electrode 44 are higher than the potential energy $\phi 41$.

Figure 5:
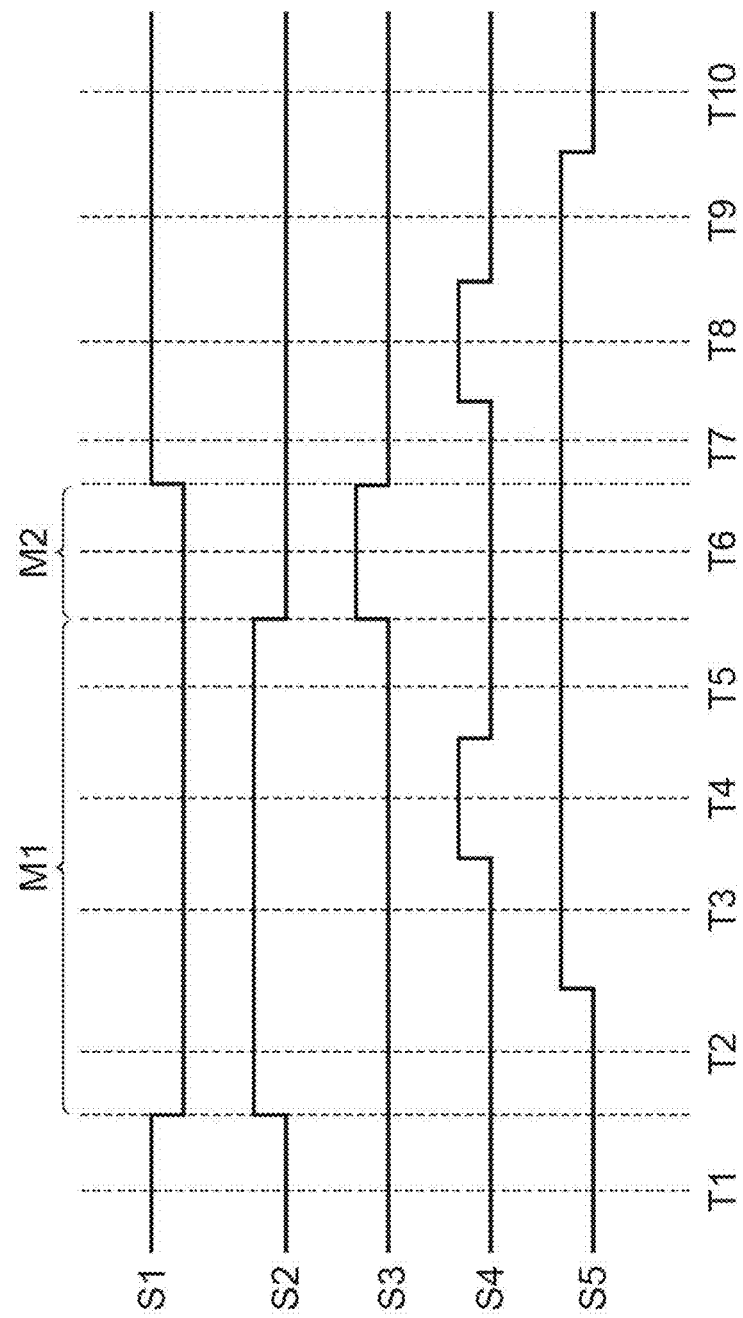
FIG. 5 is a timing chart illustrating an operation example of the image sensor.
Figure 6:
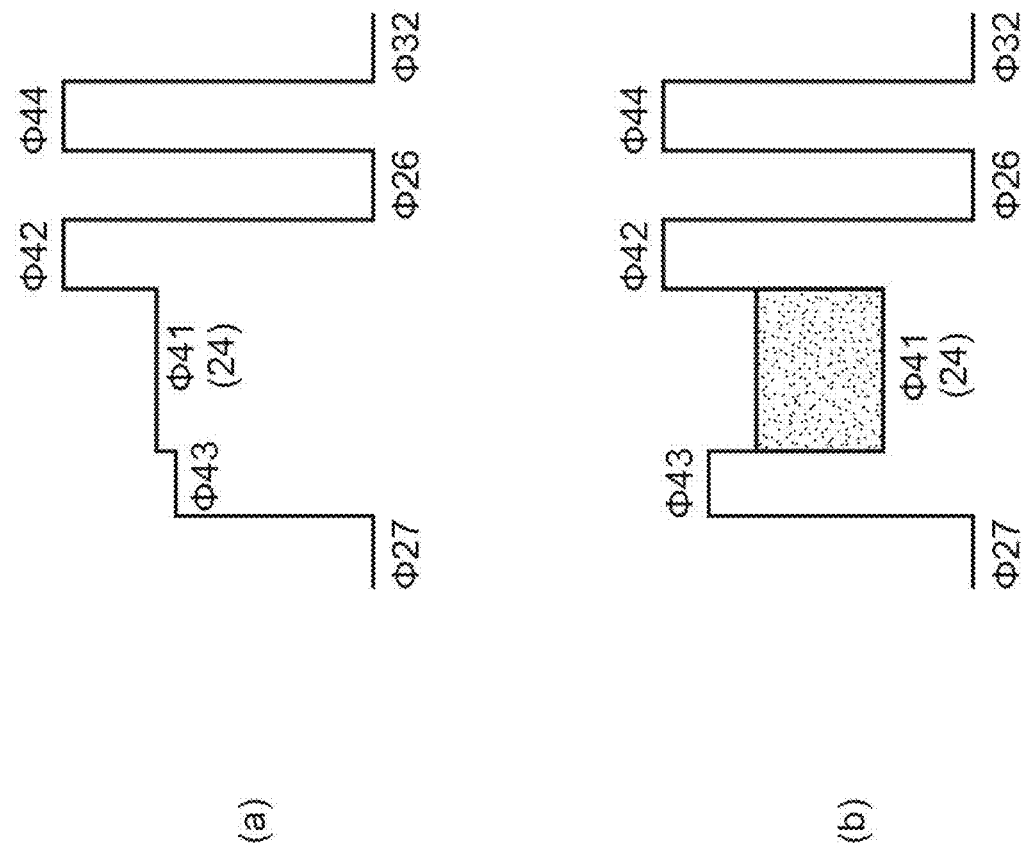
FIGS. 6(a) and 6(b) are potential energy distribution diagrams for describing an operation example of the image sensor.
Figure 7:
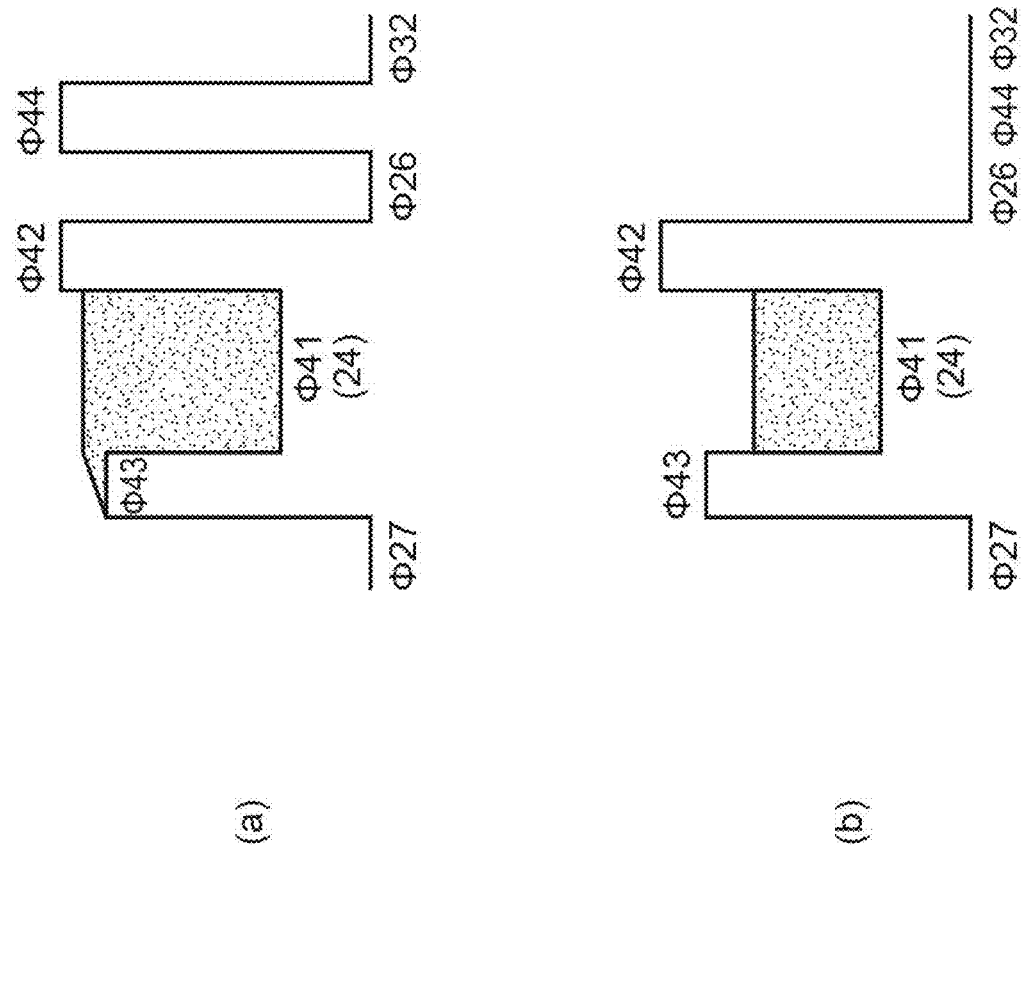
FIGS. 7(a) and 7(b) are potential energy distribution diagrams for describing an operation example of the image sensor.
Figure 8:
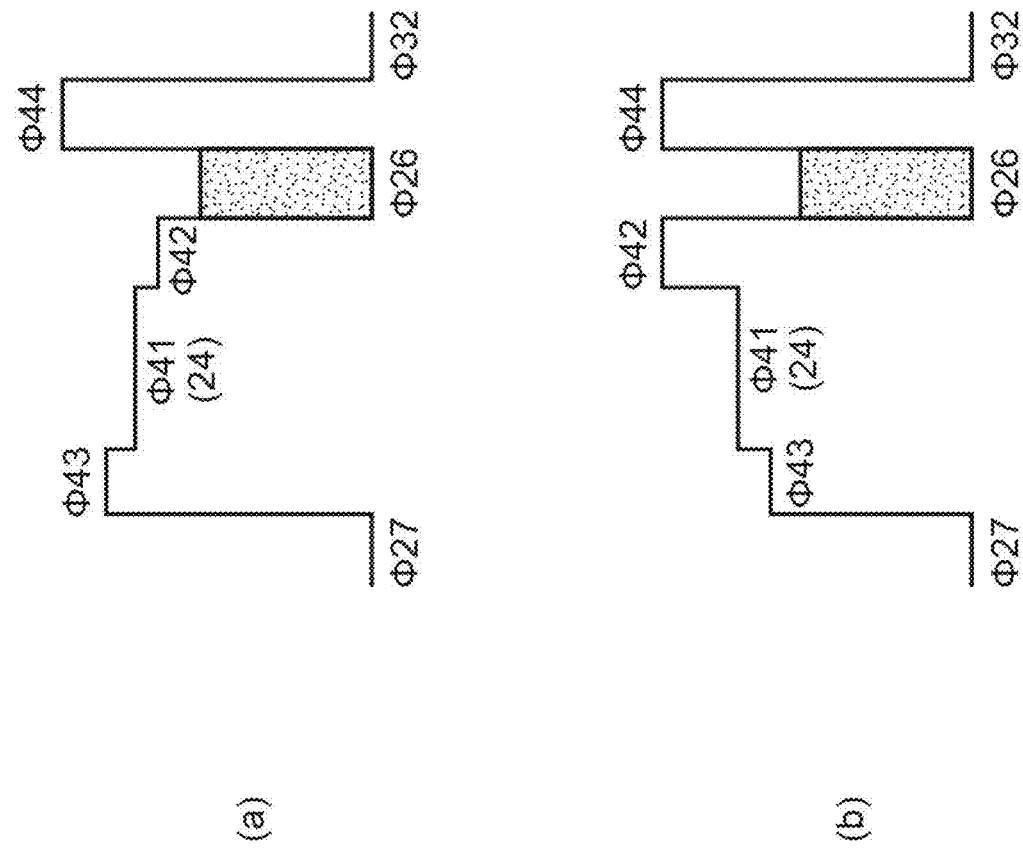
FIGS. 8(a) and 8(b) are potential energy distribution diagrams for describing an operation example of the image sensor.

Note that, as illustrated in FIG. 5, a high-level control voltage S2 and a low-level control voltage S2 are applied to the charge collection electrode 41. For example, the high-level control voltage S2 is a positive voltage, and the low-level control voltage S2 is an electric potential lower than the high-level control voltage S2. The low-level control voltage S2 may be a positive electric potential or a negative electric potential. When the high-level control voltage S2 is applied to the charge collection electrode 41, the potential energy $\phi 41$ in the region immediately below the charge collection electrode 41 is a low level, and when the low-level control voltage S2 is applied to the charge collection electrode 41, the potential energy $\phi 41$ is a high level. In this way, a potential energy magnitude relationship is opposite to a control voltage magnitude relationship. These points are similarly applied to the transfer gate electrode 42, the overflow gate electrode 43, and the gate electrode 44. Note that, in adjusting the magnitude of the potential energy (depletion electric potential) in the region immediately below the electrode, the magnitude of the electric potential given to the electrode may be adjusted, or the impurity concentration in the region immediately below the electrode may be adjusted.

In a first period M1 after time T1, a charge accumulation process (first step) for accumulating charges, which are generated in the charge generation region 29, in the charge accumulation region 24 is executed (time T2, FIG. 6(b)). In the first period M1, electric potentials of the charge collection electrode 41 and the transfer gate electrode 42 are controlled so that the potential energy $\phi 41$ in the region immediately below the charge collection electrode 41 is the low level (first level) lower than the high level (second level), and the potential energy $\phi 42$ in the region immediately below the transfer gate electrode 42 is higher than the potential energy $\phi 41$.

In the first period M1, a negative voltage (for example, a maximum of −60 V) is applied to the semiconductor region 21 with reference to the electric potential in the well region 31. That is, a reverse bias is applied to a pn junction formed in the avalanche multiplication region 23. In this way, electric field strength of $3 \times 10^5$ to $4 \times 10^5$ V/cm is generated in the avalanche multiplication region 23. In this state, when light is incident on the semiconductor layer 2 from the second surface 2b, electrons are generated by absorption of light in the semiconductor regions 21 and 22. The generated electrons are multiplied in the avalanche multiplication region 23 and move at high speed to the charge accumulation region 24 having the highest electric potential.

As described above, in the first period M1, the potential energy $\phi 42$ in the region immediately below the transfer gate electrode 42 is higher than the potential energy $\phi 41$ in the region immediately below the transfer gate electrode 42. Therefore, charges moving to the charge accumulation region 24 are accumulated in the charge accumulation region 24 without moving to the charge transfer region 26.

Further, in the first period M1, electric potentials of the charge collection electrode 41, the transfer gate electrode 42, and the overflow gate electrode 43 are controlled so that the potential energy $\phi 43$ in the region immediately below the overflow gate electrode 43 is higher than the potential energy $\phi 41$ in the region immediately below the charge collection electrode 41 and is lower than the potential energy $\phi 42$ in the region immediately below the transfer gate electrode 42. That is, the potential energy $\phi 43$ is set to have the magnitude between the potential energy $\phi 41$ and the potential energy $\phi 42$. In this way, as illustrated in FIG. 7(a), charges overflowing from the charge accumulation region 24 may be moved to the overflow region 27. The charges transferred to the overflow region 27 are discharged to the outside.

In the first period M1, a pixel selection process for selecting a pixel 20 in which charges are read is executed (time T3). In the pixel selection process, the pixel 20 in which charges are read is selected using the selection transistor R3.

In the first period M1, subsequent to the pixel selection process, a second reset process for resetting the charge transfer region 26 is executed (time T4, FIG. 7(b)). The second reset process is executed using the reset transistor R1. In the second reset process, the electric potential of the gate electrode 44 is controlled so that the potential energy $\phi 44$ in the region immediately below the gate electrode 44 is lowered. The potential energy $\phi 44$ is lowered, for example, until the potential energy $\phi 44$ is about the same as potential energy $\phi 26$ of the charge transfer region 26. In this way, charges remaining in the charge transfer region 26 are discharged to the outside through the channel region 32, and the charge transfer region 26 is reset. After completion of the second reset process, the potential energy $\phi 44$ is restored.

In the first period M1, a noise acquisition process is executed subsequent to the second reset process (time T5). In the noise acquisition process, kTC noise in the charge transfer region 26 is acquired. In this way, an output may be calculated in consideration of the kTC noise, and detection accuracy may be improved.

In the second period M2 after the first period M1, a charge transfer process (second step) for transferring charges from the charge accumulation region 24 to the charge transfer region 26 is executed (time T6, FIG. 8(a)). In the second period M2, the electric potentials of the charge collection electrode 41, the transfer gate electrode 42, and the overflow gate electrode 43 are controlled so that the potential energy $\phi 41$ in the region (the charge accumulation region 24) immediately below the charge collection electrode 41 is the high level, the potential energy $\phi 42$ in the region immediately below the transfer gate electrode 42 is lower than the potential energy $\phi 41$, and the potential energy $\phi 43$ in the region immediately below the overflow gate electrode 43 is higher than the potential energy $\phi 41$. In this way, charges accumulated in the charge accumulation region 24 are transferred to the charge transfer region 26.

Subsequently, a reading process for reading charges accumulated in the charge transfer region 26 is executed (time T7, FIG. 8(b)). In the reading process, charges accumulated in the charge transfer region 26 are read using the read transistor R2. In the reading process, the electric potentials of the charge collection electrode 41, the transfer gate electrode 42, and the overflow gate electrode 43 are controlled so that the potential energy $\phi 41$ in the region immediately below the charge collection electrode 41 is a high level, the potential energy $\phi 42$ in the region immediately below the transfer gate electrode 42 is higher than the potential energy $\phi 41$, and the potential energy $\phi 43$ in the region immediately below the overflow gate electrode 43 is lower than the potential energy $\phi 41$.

Figure 9:
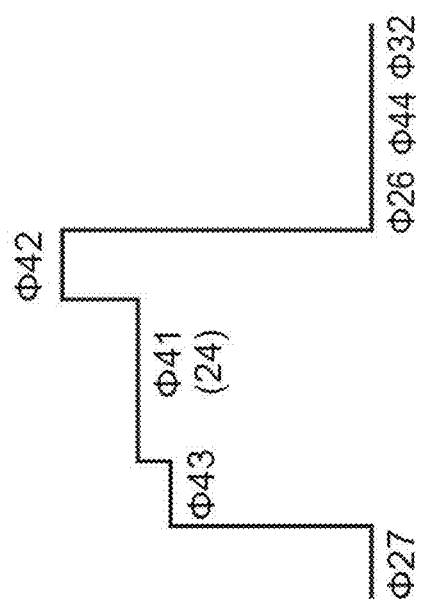
FIG. 9 is a potential energy distribution diagram for describing an operation example of the image sensor.

Subsequently, a third reset process for resetting the charge transfer region 26 is executed (time T8, FIG. 9). The third reset process is executed using the reset transistor R1. In the third reset process, the electric potential of the gate electrode 44 is controlled so that the potential energy $\phi 44$ in the region immediately below the gate electrode 44 is lowered. The potential energy $\phi 44$ is lowered, for example, until the potential energy $\phi 44$ is about the same as the potential energy $\phi 26$ in the charge transfer region 26. In this way, charges remaining in the charge transfer region 26 are discharged to the outside through the channel region 32, and the charge transfer region 26 is reset. After completion of the third reset process, the potential energy $\phi 44$ is restored.

Subsequently, a deselection process for deselecting the selected pixel 20 is executed (time T9). The deselection process is executed using the selection transistor R3. After the deselection process, and until a subsequent charge accumulation process is started, the image sensor 1 is in the same state as that during the first reset process (time T10). That is, the electric potentials of the charge collection electrode 41, the transfer gate electrode 42, and the overflow gate electrode 43 are controlled so that the potential energy $\phi 41$ in the region immediately below the charge collection electrode 41 is the high level, the potential energy $\phi 42$ in the region immediately below the transfer gate electrode 42 is higher than the potential energy $\phi 41$, and the potential energy $\phi 43$ in the region immediately below the overflow gate electrode 43 is lower than the potential energy $\phi 41$. In this way, charges flowing into the charge accumulation region 24 are discharged to the outside through the overflow region 27.

[Function and Effect]

In the light detection device 100, in the first period M1, the potential energy $\phi 42$ in the region immediately below the transfer gate electrode 42 is set to be higher than the potential energy $\phi 41$ in the region (the charge accumulation region 24) immediately below the charge collection electrode 41, and charges generated in the charge generation region 29 are accumulated in the charge accumulation region 24. In the second period M2, the potential energy $\phi 42$ in the region immediately below the transfer gate electrode 42 is set to be lower than the potential energy $\phi 41$ in the region immediately below the charge collection electrode 41, and charges are transferred from the charge accumulation region 24 to the charge transfer region 26. In the light detection device 100, in the first period M1, the potential energy $\phi 41$ in the region immediately below the charge collection electrode 41 is set to a low level (first level) lower than a high level (second level). In this way, a potential energy well in the charge accumulation region 24 may be deepened, and a saturated charge amount in the charge accumulation region 24 may be increased. Meanwhile, in the second period M2, the potential energy $\phi 41$ in the region immediately below the charge collection electrode 41 is set to the high level higher than the low level. In this way, a difference in potential energy between the charge accumulation region 24 and the charge transfer region 26 may be increased, and charge transfer efficiency may be improved. Therefore, according to the light detection device 100, it is possible to achieve both an increase in the saturated charge amount and an improvement of the charge transfer efficiency.

Figure 10:
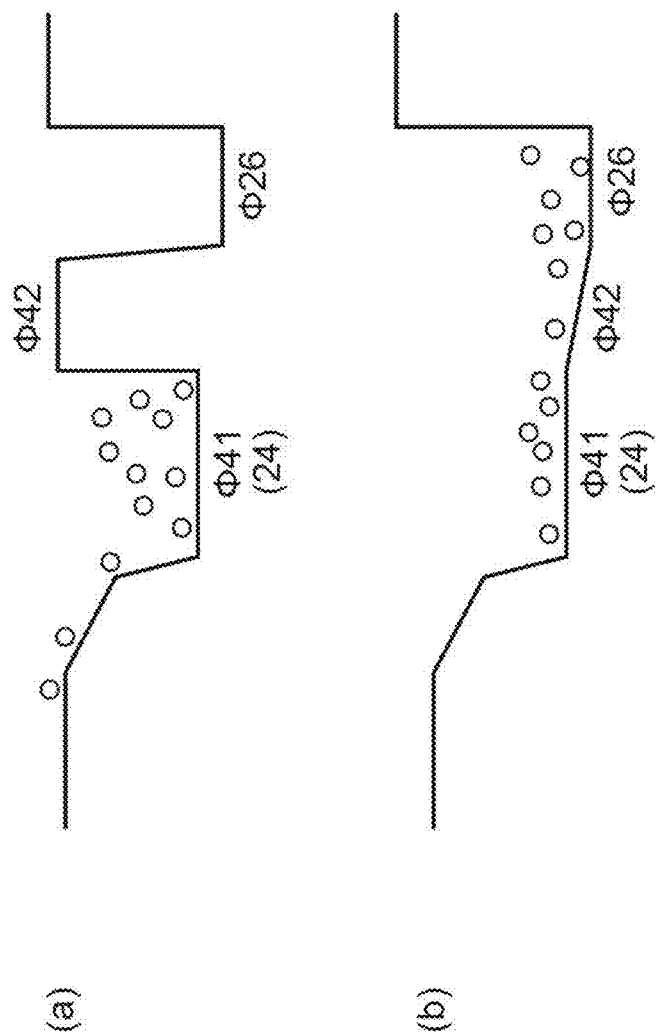
FIGS. 10(a) and 10(b) are potential energy distribution diagrams for describing a first operation example of the image sensor according to a comparative example.
Figure 11:
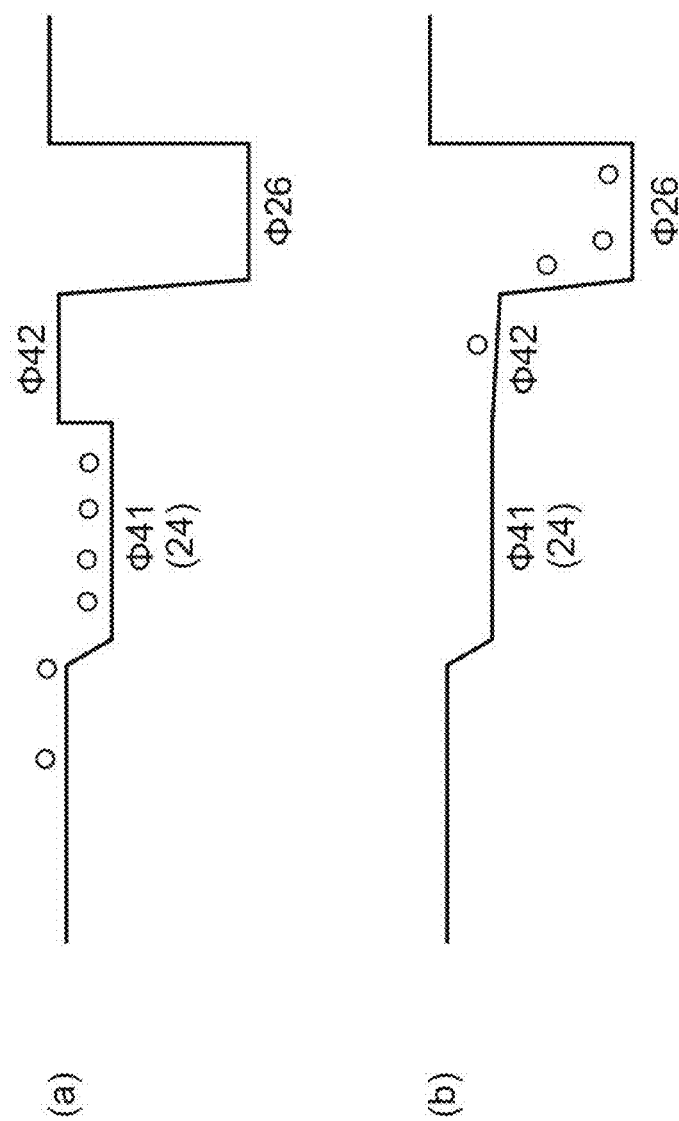
FIGS. 11(a) and 11(b) are potential energy distribution diagrams for describing a second operation example of the image sensor according to the comparative example.
Figure 12:
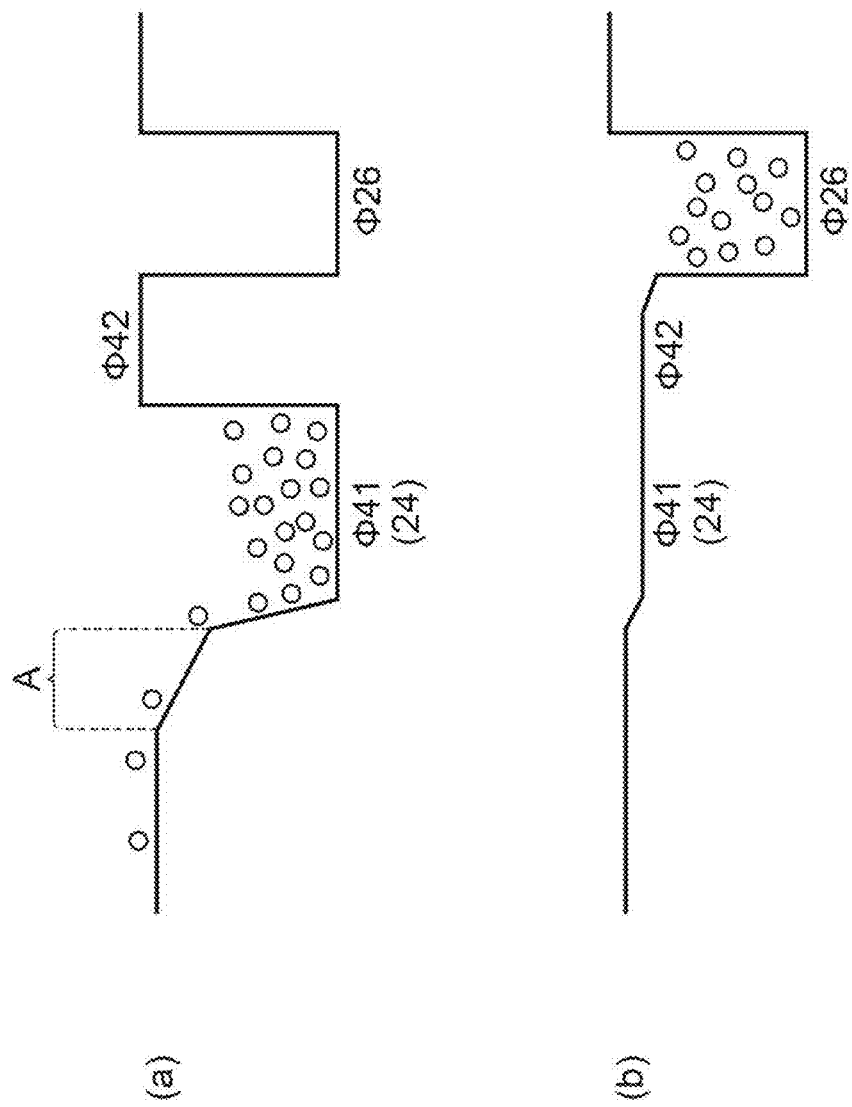
FIGS. 12(a) and 12(b) are potential energy distribution diagrams for describing an operation example of the image sensor according to the embodiment.

That is, in the light detection device 100, both the increase in the saturated charge amount and the improvement of the charge transfer efficiency are achieved by providing the charge collection electrode 41 on the charge accumulation region 24, and changing the magnitude of the potential energy $\phi 41$ in the region immediately below the charge collection electrode 41 between the first period M1 and the second period M2. This point will be further described with reference to FIGS. 10 to 12. FIGS. 10 and 11 illustrate operation examples of the image sensor when the potential energy $\phi 41$ is constant as a comparative example. FIGS. 10(a) and 10(b) illustrate a first operation example in which the potential energy $\phi 41$ is constant at a low level in the comparative example. FIGS. 11(a) and 11(b) illustrate a second operation example in which the potential energy $\phi 41$ is constant at a high level in the comparative example. FIGS. 12(a) and 12(b) illustrate an operation example of the image sensor 1 in the light detection device 100. Note that, in FIGS. 10 to 12, illustration of the overflow region and the overflow gate electrode is omitted.

In the comparative example, in the first operation example in which the potential energy $\phi 41$ is constant at a low level, as illustrated in FIG. 10(a), during charge accumulation, it is possible to deepen the potential energy well in the charge accumulation region 24. Meanwhile, as illustrated in FIG. 10(b), during charge transfer, a difference in potential energy between the charge accumulation region 24 and the charge transfer region 26 is small, and the charge transfer efficiency is low. A quantity of charges that can be completely transferred from the charge accumulation region 24 to the charge transfer region 26 is about a value obtained by multiplying a difference in potential energy between the charge accumulation region 24 and the charge transfer region 26 by a capacity of the charge transfer region 26. Therefore, when the difference in potential energy is small, the amount that can be completely transferred decreases, and detection sensitivity decreases. Further, when the difference in potential energy is small, a barrier is likely to occur on a transfer path, which also lowers the transfer efficiency.

In the comparative example, in the second operation example in which the potential energy φ41 is constant at a high level, as illustrated in FIG. 11(b), during charge transfer, a difference in potential energy between the charge accumulation region 24 and the charge transfer region 26 is large, and the charge transfer efficiency may be ensured. Meanwhile, as illustrated in FIG. 11(a), during charge accumulation, the potential energy well in the charge accumulation region 24 is shallow, and the saturated charge amount in the charge accumulation region 24 decreases. In this way, in the comparative example, since the potential energy φ41 is constant, it is possible to achieve either the increase in the saturated charge amount or the improvement of the charge transfer efficiency.

In contrast, in the method for driving the image sensor 1 described above, as illustrated in FIG. 12(a), during charge accumulation, the potential energy φ41 is set to a low level, and thus it is possible to deepen the potential energy well in the charge accumulation region 24, and to increase the saturated charge amount in the charge accumulation region 24. In addition, it is possible to widen an electric potential gradient range A formed at an edge of the charge accumulation region 24, and as a result, it is possible to increase a moving speed of charges flowing into the charge accumulation region 24. In addition, as illustrated in FIG. 12(b), during charge transfer, since the potential energy φ41 is set to a high level, it is possible to increase the difference in potential energy between the charge accumulation region 24 and the charge transfer region 26, and to improve charge transfer efficiency. As described above, in the method for driving the image sensor 1, the electric potential of the charge collection electrode 41 and the electric potential of the transfer gate electrode 42 are controlled in synchronization. As a result, it is possible to achieve both the increase in the saturated charge amount and the improvement of the charge transfer efficiency.

The charge generation region 29 includes the avalanche multiplication region 23. In this way, avalanche multiplication may be caused in the charge generation region 29, and detection sensitivity may be increased. Meanwhile, in this case, the amount of charge generated in the charge generation region 29 is extremely large. However, in the light detection device 100, the saturated charge amount is increased as described above, and thus saturation of the capacity may be suppressed even in such a case.

In the first period M1, the electric potentials of the charge collection electrode 41, the transfer gate electrode 42, and the overflow gate electrode 43 are controlled so that the potential energy φ43 in the region immediately below the overflow gate electrode 43 is higher than the potential energy φ41 in the region immediately below the charge collection electrode 41 and is lower than the potential energy φ42 in the region immediately below the transfer gate electrode 42. In this way, charges overflowing from the charge accumulation region 24 during the first period M1 may be moved to the overflow region 27.

The image sensor 1 has a conductive type different from that of the charge accumulation region 24, and has the intervening region 25 disposed between the charge accumulation region 24 and the charge collection electrode 41. In this way, generation of dark current around the charge collection electrode 41 may be suppressed.

In addition, in a state where an electric potential is applied to the charge collection electrode 41 so that the potential energy φ41 in the region immediately below the charge collection electrode 41 is the high level (a state in which the low-level control voltage S2 is applied to the charge collection electrode 41), generation of dark current around the charge collection electrode 41 may be effectively suppressed by the intervening region 25 due to the following reason. As the hole concentration at an interface of the intervening region 25 (a surface facing the charge collection electrode 41) increases, the dark current decreases. When the intervening region 25 is formed by ion implantation, the hole concentration in the intervening region 25 peaks at a position away from the interface. By applying an electric potential to the charge collection electrode 41 as described above, the hole concentration in a region immediately below the interface of the intervening region 25 may be increased by accumulation effect, and generation of dark current may be effectively suppressed.

Note that there is a rangefinder sensor as an image sensor that transfers charges using a transfer gate electrode. The rangefinder sensor uses a plurality of transfer gate electrodes to distribute charges among a plurality of charge transfer regions. In the rangefinder sensor, a photogate electrode is disposed on a charge distribution region to attract charges. An electric potential of the photogate electrode is kept constant. That is, unlike the charge collection electrode 41 of the image sensor 1 described above, the photogate electrode of the rangefinder sensor does not have an electric potential changed according to a period. In the rangefinder sensor, charges flowing into the charge distribution region are immediately transferred to the charge transfer region, and thus charges are not accumulated in the charge distribution region. Therefore, it is not required to increase the saturated charge amount in the charge distribution region.

The disclosure is not limited to the above embodiment. For example, a material and shape of each configuration are not limited to the above-mentioned material and shape, and various materials and shapes may be adopted. The charges transferred to the overflow region 27 do not have to be discharged. For example, the charges may be accumulated in the overflow region 27, and the accumulated charges may be read. In this case, apart from the overflow region 27, it is possible to provide a discharge region for discharging the charges remaining in the charge accumulation region 24 to the outside. The intervening region 25 does not have to be provided. In this case, the charge accumulation region 24 may reach the first surface 2a of the semiconductor layer 2.

In the image sensor 1, light may be incident on the semiconductor layer 2 from either the first side or the second side. The conductive types of the p-type and the n-type may be the opposite to those described above. The plurality of pixels 20 may be one-dimensionally arranged along the first surface 2a of the semiconductor layer 2. Alternatively, only a single pixel 20 may be provided.

REFERENCE SIGNS LIST

1: image sensor (light sensor), 23: avalanche multiplication region, 24: charge accumulation region, 25: intervening region, 26: charge transfer region, 27: overflow region, 29: charge generation region, 41: charge collection electrode, 42: transfer gate electrode, 43: overflow gate electrode, 60: controller, 100: light detection device, M1: first period, M2: second period, φ41: potential energy in region immediately below charge collection electrode, φ42: potential energy in region immediately below gate electrode, φ43: potential energy in region immediately below overflow gate electrode.

The invention claimed is:
1. A light detection device comprising:
a light sensor comprising a semiconductor substrate, and
a controller that controls the light sensor, wherein:
the light sensor includes:
a charge generation region that generates charges in response to incident light;
a charge accumulation region in which charges generated in the charge generation region are accumulated, the charge accumulation region being disposed on the charge generation region in a thickness direction of the semiconductor substrate;
a charge transfer region to which charges are transferred from the charge accumulation region;
a charge collection electrode disposed on the charge accumulation region, the charge collection electrode overlapping the charge accumulation region and the charge generation region in the thickness direction of the semiconductor substrate; and
a transfer gate electrode disposed on a region between the charge accumulation region and the charge transfer region;
an intervening region having a conductive type different from a conductive type of the charge accumulation region and disposed between the charge accumulation region and the charge collection electrode; and
a well region that is adjacent to the intervening region and has a conductive type same as the conductive type of the intervening region,
wherein:
the charge transfer region is formed in the well region,
the well region is grounded, and
a carrier concentration of the intervening region is smaller than a carrier concentration of the well region,
the controller:
controls electric potentials of the charge collection electrode and the transfer gate electrode so that potential energy in a region immediately below the charge collection electrode is a first level, and potential energy in a region immediately below the transfer gate electrode is higher than the potential energy in the region immediately below the charge collection electrode in a first period;
controls electric potentials of the charge collection electrode and the transfer gate electrode so that the potential energy in the region immediately below the charge collection electrode is a second level higher than the first level, and the potential energy in the region immediately below the transfer gate electrode is lower than the potential energy in the region immediately below the charge collection electrode in a second period after the first period; and
controls potential energy of the charge accumulation region in the first period and the second period by controlling the electric potential of the charge collection electrode, and
in the light sensor, a region in which potential energy is controlled by controlling the electric potential of the charge collection electrode is adjacent to a region in which potential energy is controlled by controlling electric potential of the transfer gate electrode.

2. The light detection device according to claim 1, wherein the charge generation region includes an avalanche multiplication region.

3. The light detection device according to claim 1, wherein:
the light sensor further includes:
an overflow region; and
an overflow gate electrode disposed on a region between the charge accumulation region and the overflow region, and
the controller controls electric potentials of the charge collection electrode, the transfer gate electrode, and the overflow gate electrode so that potential energy in a region immediately below the overflow gate electrode is higher than the potential energy in the region immediately below the charge collection electrode and is lower than the potential energy in the region immediately below the transfer gate electrode in the first period.

4. The light detection device according to claim 1, wherein the charge transfer region is disposed on the charge generation region in the thickness direction of the semiconductor substrate.

5. The light detection device according to claim 1, further comprising a well region disposed on the charge generation region in the thickness direction of the semiconductor substrate, wherein the charge transfer region is disposed inside the well region.

6. A method for driving a light sensor, the light sensor including:
a semiconductor substrate;
a charge generation region that generates charges in response to incident light;
a charge accumulation region in which charges generated in the charge generation region are accumulated, the charge accumulation region being disposed on the charge generation region in a thickness direction of the semiconductor substrate;
a charge transfer region to which charges are transferred from the charge accumulation region;
a charge collection electrode disposed on the charge accumulation region, the charge collection electrode overlapping the charge accumulation region and the charge generation region in the thickness direction of the semiconductor substrate; and
a transfer gate electrode disposed on a region between the charge accumulation region and the charge transfer region;
an intervening region having a conductive type different from a conductive type of the charge accumulation region and disposed between the charge accumulation region and the charge collection electrode; and
a well region that is adjacent to the intervening region and has a conductive type same as the conductive type of the intervening region,
wherein:
the charge transfer region is formed in the well region,
the well region is grounded, and
a carrier concentration of the intervening region is smaller than a carrier concentration of the well region, and the method for driving the light sensor comprising:
a first step of controlling electric potentials of the charge collection electrode and the transfer gate electrode so that potential energy in a region immediately below the charge collection electrode is a first level, and potential energy in a region immediately below the transfer gate electrode is higher than the potential energy in the region immediately below the charge collection electrode; and a second step of controlling electric potentials of the charge collection electrode and the transfer gate electrode so that the potential energy in the region immediately below the charge collection electrode is a second level higher than the first level, and the potential energy in the region immediately below the transfer gate electrode is lower than the potential energy in the region immediately below the charge collection electrode after the first step, wherein in the first step and the second step, potential energy of the charge accumulation region is controlled by controlling the electric potential of the charge collection electrode, and wherein in the light sensor, a region in which potential energy is controlled by controlling the electric potential of the charge collection electrode is adjacent to a region in which potential energy is controlled by controlling electric potential of the transfer gate electrode.

7. The method according to claim 6, wherein the charge transfer region is disposed on the charge generation region in the thickness direction of the semiconductor substrate.

8. The method according to claim 6, wherein the charge transfer region is disposed inside a well region, the well region being disposed on the charge generation region in the thickness direction of the semiconductor substrate.

9. A light detection device comprising:
a light sensor comprising a semiconductor substrate, and
a controller that controls the light sensor, wherein:
the light sensor includes:
  a charge generation region that generates charges in response to incident light;
  a charge accumulation region in which charges generated in the charge generation region are accumulated, the charge accumulation region being disposed on the charge generation region in a thickness direction of the semiconductor substrate;
  a charge transfer region to which charges are transferred from the charge accumulation region;
  a charge collection electrode disposed on a surface of the semiconductor substrate and on the charge accumulation region, the charge collection electrode overlapping the charge accumulation region and the charge generation region in the thickness direction of the semiconductor substrate, the charge accumulation region reaching the surface of the semiconductor substrate; and
  a transfer gate electrode disposed on a region between the charge accumulation region and the charge transfer region,
the controller:
controls electric potentials of the charge collection electrode and the transfer gate electrode so that potential energy in a region immediately below the charge collection electrode is a first level, and potential energy in a region immediately below the transfer gate electrode is higher than the potential energy in the region immediately below the charge collection electrode in a first period;
controls electric potentials of the charge collection electrode and the transfer gate electrode so that the potential energy in the region immediately below the charge collection electrode is a second level higher than the first level, and the potential energy in the region immediately below the transfer gate electrode is lower than the potential energy in the region immediately below the charge collection electrode in a second period after the first period; and
controls potential energy of the charge accumulation region in the first period and the second period by controlling the electric potential of the charge collection electrode, and in the light sensor, a region in which potential energy is controlled by controlling the electric potential of the charge collection electrode is adjacent to a region in which potential energy is controlled by controlling electric potential of the transfer gate electrode.

* * * * *